Patented Oct. 3, 1950

2,524,318

UNITED STATES PATENT OFFICE 2,524,318

PROCESS OF PRODUCING LARGER ARYLALKANES FROM SMALLER ONES

Morris S. Kharasch, Chicago, Ill., assignor to Eli Lilly and Company, Indianapolis, Ind., a corporation of Indiana No Drawing. Application June 9, 1949, Serial No. 98,159

15 Claims. (Cl. 260—613)

This invention relates to a process for producing larger arylalkanes which have a plurality of aryl groups from smaller arylalkanes which have fewer aryl groups; and to certain new polyarylalkanes so produced.

In the initial smaller arylalkane the alkane part must have a hydrogen-carrying aprimary carbon atom (defined below) linked directly to the ring nucleus of an aryl group of the class consisting of phenyl, halophenyl in which the halogen has an atomic weight less than 81, lower-alkylphenyl, xenyl, lower-alkoxyphenyl, and methylenedioxyphenyl; and in my process a hydrogen atom is removed from such an aprimary carbon atom, and the radicals resulting from such hydrogen removal are linked together.

The present application is a continuation-in-part of my co-pending application Serial No. 581,946, filed March 9, 1945, and now Patent No. 2,477,621, granted August 2, 1949; which in turn was filed as a continuation-in-part of my application Serial No. 503,172, filed September 20, 1943, and now Patent No. 2,426,224, granted August 26, 1947.

In carrying out my present invention I treat the smaller arylalkane at elevated temperature and in the substantial absence of water with a diacyl peroxide in which at least one of the acyl groups is an alkacyl group of not more than four carbon atoms; preferably with diacetyl peroxide. The diacyl peroxide is desirably a dialkacyl peroxide—that is, (as defined below), one containing two alkacyl groups, such as acetyl, propionyl, or butyryl. But the diacyl peroxide may be an ar-alkacyl peroxide (defined below), for it is necessary only that there be one alkacyl group, so that the second acyl group may if desired be an aracyl group, such for instance as benzoyl. The diacyl peroxide used can not be a diaracyl peroxide.

As used in this specification and its appended claims:

(a) By "alkacyl group" I mean the acyl group of an alkyl carboxylic acid;

(b) By "aracyl group" I mean the acyl group of an aromatic carboxylic acid;

(c) By "dialkacyl peroxide" I mean a peroxide in which both acyl groups attached to the bivalent —O—O— group are alkacyl groups;

(d) By "diaracyl peroxide" I mean a peroxide in which both acyl groups attached to the bivalent —O—O— group are aracyl groups;

(e) By "ar-alkacyl peroxide" I mean a peroxide in which one acyl group attached to the bivalent —O—O— group is an alkacyl group and the other is an aracyl group.

(f) By "aprimary carbon atom" I mean a carbon atom of the class consisting of secondary and tertiary carbon atoms.

(g) By "primary or secondary or tertiary hydrogen atoms" I mean hydrogen atoms directly attached to primary or secondary or tertiary carbon atoms respectively;

(h) By "aprimary hydrogen atom" I mean a hydrogen atom of the class consisting of secondary and tertiary hydrogen atoms; and (i) By "arylalkane" I mean an alkane having at least one aryl substituent of the class defined above directly attached by its ring nucleus to a carbon atom of the alkane.

The preferred diacyl peroxide, as already noted, is diacetyl peroxide; which is effective in all cases and gives the highest yields. I can use dipropionyl peroxide and dibutyryl peroxide fairly effectively, the former more effectively than the latter; and I can use diisobutyryl peroxide, but much less effectively and with rather poor results in some cases.

The diacyl peroxide does not itself combine with the initial smaller arylalkanes. Instead, it acts exclusively to remove aprimary hydrogen atoms from them; whereupon the radicals remaining after that removal of aprimary hydrogen atoms from the smaller arylalkanes unite one with another by single carbon-to-carbon bonds, to produce larger arylalkanes (polyarylalkanes) which save for the absence of the removed aprimary hydrogen atoms are polymers constituting the sum of two or more original smaller arylalkanes.

The initial smaller arylalkanes to which my invention is applicable are the lower alkanes (with one or more aryl substitutents) having not to exceed 12 carbon atoms, and in which the ring nucleus of an aryl substituent is directly attached to an aprimary alkane carbon atom carrying one or two hydrogen atoms. The alkane may be methane provided its single carbon atom has directly attached to it not only the ring nucleus of an aryl substituent of the class defined but also a carbon atom of another substituent (which may also be an aryl substituent). But usually the alkane will have at least two alkane carbon atoms, in order to make one which carries an aryl substituent an aprimary carbon atom. This aprimary carbon atom must carry at least one hydrogen atom, which is all it can carry if the aprimary carbon atom is a tertiary carbon atom; but if that aprimary carbon is a secondary carbon atom it may carry two hydrogen atoms.

If the aryl substituent is a halophenyl, the halogen may be bromine, chlorine, or fluorine; and the halophenyl may be either monohalophenyl, dihalophenyl, or trihalophenyl, with the halogen or halogens in any position or positions. If the aryl substituent is a lower-alkyl phenyl, there may be one or more than one alkyl groups, in any position or positions, and the alkyl groups may be any alkyl groups up to and including propyl; for instance, if the alkyl group is methyl, the lower-alkyl phenyl may be any of the tolyls (o-, m-, or p-), any of the xylyls, any of the trimethylphenyls, any of the tetramethylphenyls, or pentamethylphenyl. If the aryl substituent is a lower-alkoxy phenyl, there may be one, two, or three alkoxy groups, in any position or positions, and the alkoxy groups may be any alkoxy groups up to and including propoxy; for instance, if the alkoxy group is methoxy, the lower-alkoxy phenyl may be any of the monomethoxyphenyls, any of the dimethoxyphenyls, or any of the trimethoxyphenyls.

In the reaction produced according to my process, in which a smaller arylalkane is treated with a diacyl peroxide having at least one of its acyl groups an alkacyl group, the diacyl peroxide (most desirably diacetyl peroxide) does not combine with the smaller arylalkane, as has already been stated. But neither does it act as a mere catalyst, for the reaction that involves the smaller arylalkane depends completely for its extent upon the amount of diacyl peroxide used. Further, the action of the diacyl peroxide used is entirely different from the action of either hydrogen peroxide or dibenzoyl peroxide.

What happens in the reaction of the diacyl peroxide (using diacetyl peroxide as an example) and a smaller arylalkane is represented by the following series of formulas:

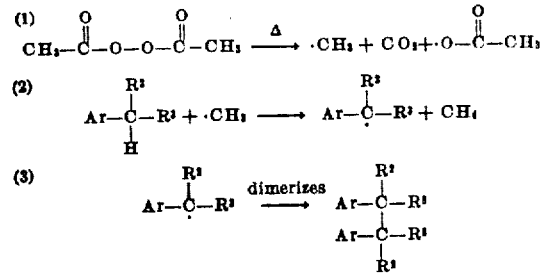

in which Ar is an aryl radical of the class defined above, and at least one and permissibly each of $R^2$ and $R^3$ is a radical containing a carbon atom directly attached to the carbon atom shown—if only one of $R^2$ and $R^3$ is such a radical, the other may be hydrogen. Either or each of $R^2$ and $R^3$ may be an aryl group of the class defined.

Equation 1 represents a decomposition of the diacetyl peroxide into carbon dioxide, a free methyl radical, and a free acetoxy radical. Equation 2 represents the abstraction by the free methyl radical of an aprimary hydrogen atom from the initial smaller arylalkane, to produce methane and the free radical of that initial smaller arylalkane. Equation 3 represents the combining (dimerizing) of two of the free radicals of the initial smaller arylalkane, to form a new carbon-to-carbon bond, thus producing a larger arylalkane having double the number of carbon atoms and double the number of aryl groups of the initial smaller arylalkane.

By limiting the amount of diacetyl peroxide added, the larger arylalkane of double the number of carbon atoms and double the number of aryl groups may be obtained in high yields, often of the order of 90% to 100% of the amount calculated on the basis of the diacetyl peroxide used.

The larger arylalkane with double the number of carbon atoms and double the number of aryl groups may in turn be treated with a suitable diacyl peroxide (desirably diacetyl peroxide) to produce a second doubling, provided that after the first doubling there still remains in the alkane a hydrogen-carrying aprimary carbon atom directly attached to the ring nucleus of an aryl group; that aprimary carbon atom may be the same one as in the initial reaction if in the initial arylalkane it was a secondary carbon atom carrying two hydrogen atoms, but not if it was a tertiary carbon atom, which can carry only a single hydrogen atom. Further, again with the same proviso, by using a larger quantity of the diacyl peroxide in the initial reaction with the original arylalkanes, it is possible to get mixtures in which in addition to arylalkanes of double the number of carbon atoms and aryl groups there are compounds of higher multiples of the original number of carbon atoms and aryl groups, such as treble the number, quadruple the number, quintuple the number, etc. With some initial arylalkanes it is possible to limit substantially the multiplying of the number of carbon atoms and aryl groups to three-fold (the trimer); but generally the multiplying of the number of carbon atoms and aryl groups is to double the number (the dimer) or to quadruple the number of carbon atoms and aryl groups (the tetramer, or the dimer of the dimer).

In some cases, when the arylalkane treated with a diacyl peroxide contains more than one aprimary hydrogen atom, a mixture of two or more dimeric substances will result.

In carrying out the general reaction with the diacyl peroxide (desirably diacetyl peroxide) it is usually desirable first to dissolve the diacyl peroxide, in the cold (desirably about 10° C.), in a small portion of the initial smaller arylalkane to be treated, if that initial arylalkane is liquid, and then to add that solution very slowly, desirably drop by drop, in the substantial absence of water, to a larger quantity of the initial smaller arylalkane. If only the dimer is desired, there is generally a several-fold molecular excess of the initial arylakane to be treated over the diacyl peroxide.

Alternatively, the diacyl peroxide may be dissolved in the cold in a suitable solvent, such as carbon tetrachloride, and that cold solution may be added slowly to a heated and concentrated solution in the same solvent of the initial smaller arylalkane to be treated. But the reaction in a third substance as a solvent is usually less desirable than when the only compounds present are the diacyl peroxide and the arylalkane to be treated.

The following are typical examples of the process of this invention, resulting in some products which are themselves new.

Example 1.—Preparation of 2,3-diphenylbutane

In this example ethylbenzene is the initial arylalkane. In it the alkane carbon atom to which the ring nucleus of the phenyl substituent is attached is a secondary carbon atom, and carries two aprimary hydrogen atoms, which are thus secondary hydrogen atoms.

Diacetyl peroxide, dissolved in ethylbenzene or carbon tetrachloride, is added slowly to ethylbenzene (3–5 molecular equivalents on the basis of the diacetyl peroxide used) maintained at 85–95° C. The addition of the peroxide requires about 2–3 hours, and the heating is continued until the reaction mixture no longer gives a test for peroxide. The excess of ethylbenzene or carbon tetrachloride is removed by distillation at reduced pressure. The material remaining in the flask is a mixture of a solid and an oil. Upon addition of alcohol, the oil dissolves; leaving behind a solid, which is suitably recovered, as by filtration, and melts at 125° C. Upon evaporation of the alcohol, an oil is obtained, which can be distilled in vacuo. Approximately equal quantities of the solid and the oil are formed. The solid is probably the meso form or 2,3-diphenylbutane, and the oil the racemic form of it.

The reactions which occur are as follows:

(4)

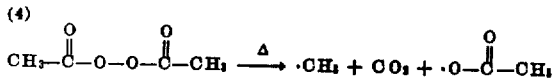

(5)

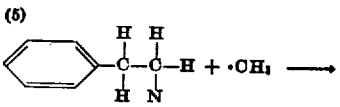

(6)

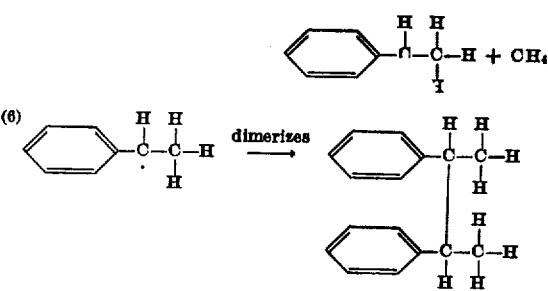

A small amount of a high boiling compound is also formed. It is probably the "tetramer"—2,3,4,5 - tetraphenyl - 3,4 - dimethylhexane. This "tetramer" probably results from the reaction of the free methyl radicals on 2,3-diphenylbutane, as follows:

(7)

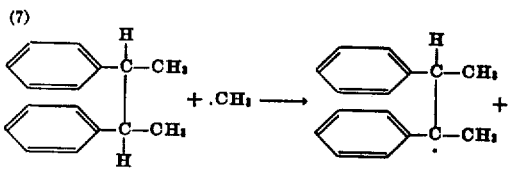

(8)

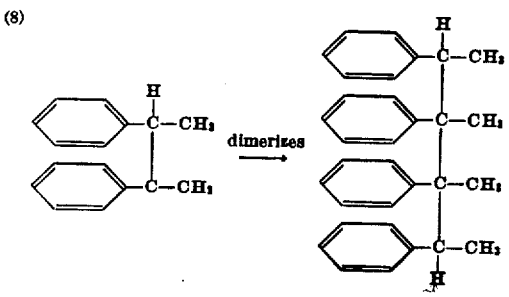

Example 2.—Preparation of 2,3-dimethyl-2,3-diphenylbutane

In this example cumene (isopropylbenzene) is the initial arylalkane. In it the alkane carbon atom to which the ring nucleus of the phenyl group is attached is a tertiary carbon atom, and carries only one aprimary hydrogen atom, which is thus a tertiary hydrogen atom.

Diacetyl peroxide, dissolved in cumene (isopropyl benzene) or in carbon tetrachloride, is added slowly to cumene (2–5 molecular equivalents on the basis of the peroxide used) maintained at a temperature of 85–125° C. The addition of the peroxide requires about 2–3 hours. When the reaction is complete, as indicated by the fact that the reaction mixture no longer gives a test for diacetyl peroxide, the excess of solvent is removed. A crystalline solid remains in the flask; which solid without further purification melts at 115° C. This is the dimer—the desired 2,3-dimethyl-2,3-diphenylbutane. The yield is quantitative on the basis of the equations given below:

(9)

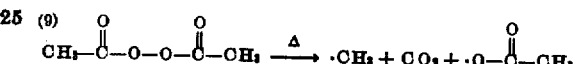

(10)

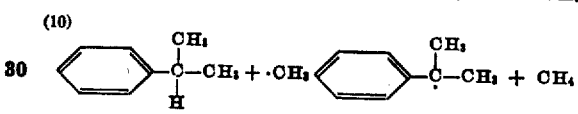

(11)

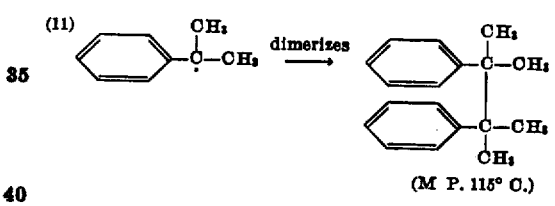

(M. P. 115° C.)

No higher polymers are formed, such as trimers and tetramers, because in the dimer the carbon atoms to which the ring nuclei are attached are quaternary carbon atoms and so carry no hydrogen atoms.

Example 3.—Preparation of 3,4-dianisylhexane

This substance, 3,4-dianisylhexane, is commonly known as "hexestrol-dimethyl ether." Upon demethylation of it the powerful estrogenic substance hexestrol is readily obtained. The previously known methods of preparing hexestrol-dimethyl ether involve a complicated series of reactions. It can, however, be prepared in one step by the reaction of this application, as follows:

In so preparing it, p-methoxy-n-propylbenzene is the initial aryl alkane. In it the alkane carbon atom to which the ring nucleus of the p-methoxyphenol group is attached is a secondary carbon atom, and carries two aprimary hydrogen atoms, which are thus secondary hydrogen atoms.

Diacetyl peroxide (or dipropionyl peroxide or dibutyryl peroxide) is dissolved in carbon tetrachloride, or preferably in p-methoxy-n-propylbenzene, and added slowly to 3–5 molecular equivalents (on the basis of the diacetyl peroxide used) of p-methoxy-n-propylbenzene kept at 85–125° C. Larger or smaller amounts of the last-named compound may be used; the smaller amounts, however, will lead to larger quantities of by-products (namely, of the "trimer"), and so I prefer to use rather larger amounts. The time for the addition of the peroxide is desirably about 2–4 hours. When the solution no longer gives a test for peroxide, the excess of p-methoxy-n- propylbenzene, or of carbon tetrachloride if that was used, is removed by distillation in vacuo. A mixture of a yellow solid and an oil remains in the flask. The mixture is crystallized from methyl alcohol. A crystalline material separates; which is collected on a filter, and melts at 144° C.

The methyl-alcohol filtrate is best worked up as follows: The methyl alcohol is removed by distillation in vacuo, and the remaining oil subjected to distillation at 2 mm. pressure. The distillate is an oil which boils at 173° C., and of which the index of refraction is $N_D^{20}$ 1.5455.

A still higher-boiling material remains in the flask. The molecular weight of this higher-boiling material is about 435.

The structure of the crystalline material obtained and of the oil which boils at 173° C., and the reactions to form them, are indicated in the following equations:

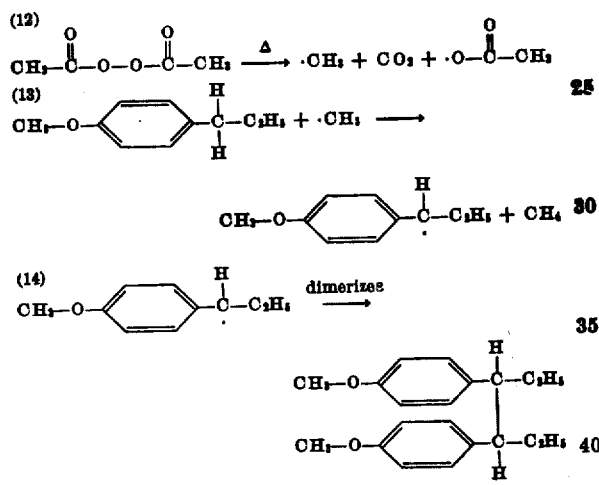

The final product of Equation 14 is the dimer, 3,4-dianisylhexane, or hexestrol dimethyl ether; and has the two forms already noted, crystal and oil, produced in about equal quantity. One form, probably the meso form, is the crystal, with the melting point of about 144° C. The other form, probably the racemic form, is the oil, which has an index of refraction of $N_D^{20}$ 1.5455. The racemic form may be resolved in known manner, to obtain the dextro and levo components separately.

The very high boiling material, of which the molecular weight was found to be about 435, is probably a trimer, 3,4,5-trianisyl-4-ethylheptane, for which the calculated molecular weight is 446. The formula of that trimer is probably as follows:

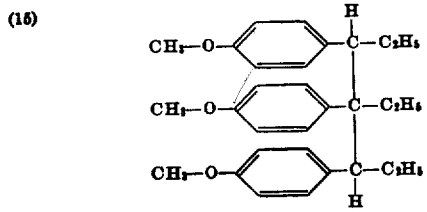

The "tetramer" can be obtained by treating the dimer hexestroldimethyl ether (either the meso form or the racemic form), with diacetyl peroxide. The reaction is best carried out in carbon tetrachloride as a solvent. The reactions involved, after the formation of the free methyl radical from the diacetyl peroxide in accordance with Formula 12, are as follows:

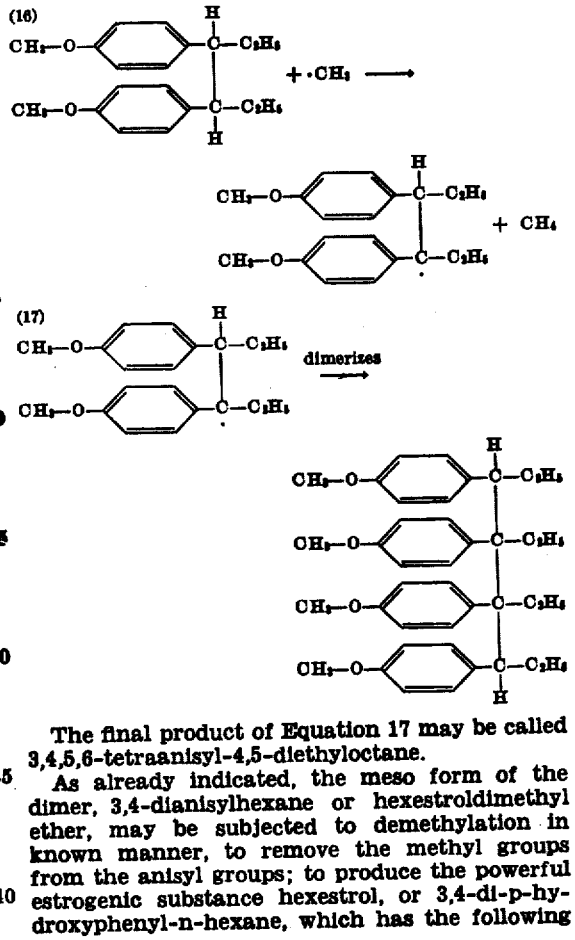

The final product of Equation 17 may be called 3,4,5,6-tetraanisyl-4,5-diethyloctane.

As already indicated, the meso form of the dimer, 3,4-dianisylhexane or hexestroldimethyl ether, may be subjected to demethylation in known manner, to remove the methyl groups from the anisyl groups; to produce the powerful estrogenic substance hexestrol, or 3,4-di-p-hydroxyphenyl-n-hexane, which has the following formula:

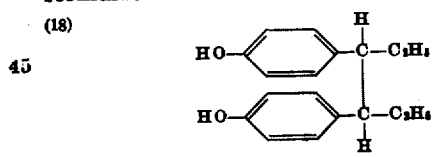

The racemic form may be similarly demethylated, and if desired the demethylated product may be resolved into its two components, dextro and levo.

*Example 4*

Example 1 may be repeated, with higher analogs of ethyl benzene as the initial arylalkane; such for instance as propyl benzene, butyl benzene, octyl benzene, and dodecyl benzene, in which an unsubstituted phenyl group is directly attached to an end carbon atom of an alkyl chain, whether branched or not, so that the alkane carbon atom directly attached to the ring nucleus of the phenyl group is a secondary carbon atom and carries two aprimary hydrogen atoms. The dimers, trimers, and tetramers of these, as obtained by my treatment with diacetyl peroxide, at elevated temperature and in the substantial absence of water, or analogs of those given in Example 1, save that instead of the appended methyl groups the appended groups are higher alkyl groups.

*Example 5*

Example 2 may be repeated, with higher analogs of cumene (isopropyl benzene) as the initial arylalkane; such for instance as 2-phenyl-butane (s-butylbenzene), 3-phenylhexane (3-hexylbenzene), 2-phenyldecane (2-decylbenzene), and 4 - phenylheptane (4 - heptylbenzene), in which an unsubstituted phenyl group is directly attached to an intermediate carbon atom of an alkyl chain, whether otherwise branched or not, so that the alkane carbon atom directly attached to the ring nucleus of the phenyl group is a tertiary carbon atom and carries only one aprimary hydrogen atom—a tertiary hydrogen atom. The dimers of these (there are no trimers or tetramers) as obtained by my treatment with diacetyl peroxide at elevated temperature and in the substantial absence of water, are analogs of that given in Example 2, save that instead of two appended methyl groups some or all appended groups are higher alkyl groups.

*Example 6*

Example 3 may be repeated, on various analogs of p-methoxy-n-propylbenzene as the initial arylalkane, in that:

(a) The methoxy group may be either meta or ortho.

(b) There may be more than one methoxy group, such for instance as in both the para and meta positions, in both the para and ortho positions, and in the para position and both ortho positions.

(c) Instead of methoxy, the alkoxy group may be either ethoxy or propoxy, but methoxy is preferred; and if there is more than one alkoxy group, the several alkoxy groups may be different, such for instance as o-ethoxy-p-methoxy-n-propyl-benzene.

(d) The alkane carrying the phenyl or substituted-phenyl group or groups may be other than the propane of example 3, with any of the modifications of a, b, and c above. For instance, it may be butane, or heptane, or decane. Thus, the initial arylalkane could be 6-(o-methoxy-p-ethoxy-phenyl)-dodecane.

(e) The substituent or substituents on the phenyl group may be other than an alkoxy group such as in Example 3; such, for instance, as any of the halogens fluorine or chlorine or bromine (a halogen with an atomic weight less than 81) in any position or positions on the phenyl group, any of the lower-alkyls methyl or ethyl or propyl in any position or positions on the phenyl group, the phenyl group in the para position (to make xenyl the complete aryl substituent), the methylenedioxy group in either the 2,3-position or the 3,4-position (usually the 3,4-position).

All of these yield dimers, and some of them trimers and tetramers (if they have two aprimary hydrogen atoms), by my treatment with diacetyl peroxide at elevated temperature and in the substantial absence of water; and those dimers, trimers, and tetramers are the analogs of those given in Example 3, with the changes as indicated in sub-paragraphs a to e above.

*Example 7*

As already indicated, other dialkacyl peroxides than diacetyl peroxide may be used in any of Examples 1 to 6. However, while dipropionyl, dibutyryl, and diisobutyryl peroxides will produce the products obtained in those examples, the best results are obtained with diacetyl peroxide.

The dialkacyl peroxide which in all cases gives the best yields of dimers, trimers, and tetramers is diacetyl peroxide; because the free methyl radical which comes from it is the most active of the free alkyl radicals. The activity of other free alkyl radicals, produced in the decomposition of higher dialkacyl peroxides, and therefore the yields of desired dimers, trimers, and tetramers, decreases as one proceeds to the free ethyl radical (from dipropionyl peroxide), the free propyl radical (from di-n-butyryl peroxide), the free isopropyl radical (from diisobutyryl peroxide), and the free tertiary-butyl radical (from ditrimethylacetyl peroxide). Thus the free tertiary-butyl radical is the least reactive of all of these, and the yields of the desired products when it is used are negligible. In general, the free methyl radical is most reactive; free primary-alkyl radicals are more reactive than free secondary-alkyl radicals; free secondary-alkyl radicals are more reactive than free tertiary-alkyl radicals; and free alkyl radicals with fewer carbon atoms are more reactive than those with more carbon atoms.

*Example 8*

Instead of diacetyl peroxide or other dialkacyl peroxide, an ar-alkacyl peroxide (or aromatic-aliphatic peroxide) may be used; such for instance as acetyl benzoyl peroxide. The initial reaction in this case, to produce the free methyl radical, is as follows:

(19)

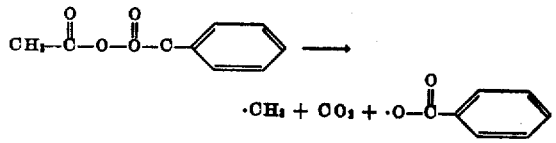

In this Example 8, as in Examples 1 to 6 inclusive, the free methyl radical is set free, and is the thing which removes an aprimary hydrogen atom from the initial smaller arylalkane to give methane and the new free radical of that initial smaller arylalkane; which in turn dimerizes to produce the desired compound with double the number of carbon atoms and double the number of aryl groups. Essentially, therefore, there is no difference whether diacetyl peroxide or acetyl benzoyl peroxide is used; since in both cases free methyl radicals are produced, and those free methyl radicals react with the initial smaller arylalkane.

On the same basis, other ar-alkacyl peroxides (aliphatic-aromatic peroxides) may be used; such for instance as propionyl benzoyl peroxide, butyryl benzoyl peroxide, acetyl napthoyl peroxide, acetyl-p-methylbenzoyl peroxide, or other peroxide of the general formula:

(20) 

in which $R^x$ represents an alkacyl group and $R^y$ represents an aracyl group. These may be used in all of Examples 1 to 6, with the limitations given in those examples for the alkacyl group. Furthermore, the highest yields are obtained when $R^x$ is the acetyl group.

*Example 9*

Similarly, unsymmetrical dialkacyl peroxides may be used in all the examples in place of the symmetrical peroxides named. Examples of these are: acetyl propionyl peroxide, acetyl butyryl peroxide, propionyl lauryl peroxide. However, no advantage accrues from these; and they are more difficult to make, and on the whole the yields obtained are poorer than when symmetrical peroxides are used.

I claim as my invention:

1. The process of producing larger arylalkanes which have a plurality of aryl groups of the class consisting of phenyl, halophenyl in which the halogen has an atomic weight less than 81, lower-alkylphenyl, xenyl, lower-alkoxyphenyl, and methylenedioxyphenyl, from smaller arylalkanes which have fewer such aryl groups and not to exceed 12 alkane carbon atoms and in which an alkane carbon atom directly attached to a ring nucleus of an aryl group is an aprimary carbon atom carrying at least one hydrogen atom; which consists in treating the smaller arylalkane at elevated temperature and in the substantial absence of water with a diacyl peroxide in which at least one of the acyl groups is an alkacyl group of not more than four carbon atoms.

2. The process of producing larger arylalkanes from smaller arylalkanes as set forth in claim 1, in which the diacyl peroxide is a dialkacyl peroxide.

3. The process of producing larger arylalkanes from smaller arylalkanes as set forth in claim 1, in which an acyl group of the diacyl peroxide is the acetyl group.

4. The process of producing larger arylalkanes from smaller arylalkanes as set forth in claim 1, in which the diacyl peroxide is diacetyl peroxide.

5. The process of producing larger arylalkanes from smaller arylalkanes as set forth in claim 1, in which the diacyl peroxide is an ar-alkacyl peroxide.

6. The process of producing larger arylalkanes from smaller arylalkanes as set forth in claim 1, in which the diacyl peroxide is benzoyl acetyl peroxide.

7. The process of producing larger arylalkanes from smaller arylalkanes as set forth in claim 1, in which the smaller arylalkane is an alkylbenzene.

8. The process of producing larger arylalkanes from smaller arylalkanes as set forth in claim 1, in which the smaller arylalkane is ethylbenzene.

9. The process of producing larger arylalkanes from smaller arylalkanes as set forth in claim 1, in which the smaller arylalkane is isopropylbenzene.

10. The process of producing larger arylalkanes from smaller arylalkanes as set forth in claim 1, in which the smaller arylalkane is a lower-alkoxyphenylalkane.

11. The process of producing larger arylalkanes from smaller arylalkanes as set forth in claim 1, in which the smaller arylalkane is a mono-lower-alkoxyphenylalkane.

12. The process of producing larger arylalkanes from smaller arylalkanes as set forth in claim 1, in which the smaller arylalkane is a methoxyphenylalkane.

13. The process of producing larger arylalkanes from smaller arylalkanes as set forth in claim 1, in which the smaller arylalkane is a methoxyphenylpropane.

14. The process of producing larger arylalkanes from smaller arylalkanes as set forth in claim 1, in which the smaller arylalkane is a p-methoxyphenylpropane.

15. The process of producing larger arylalkanes from smaller arylalkanes as set forth in claim 1, in which the smaller arylalkane is 1-p-anisylpropane.

MORRIS S. KHARASCH.

REFERENCES CITED

The following references are of record in the file of this patent:

Kharasch et al., J. Org. Chem., vol. 10, pages 401–405 (Sept., 1945).